Aug. 13, 1929.   F. PORSCHE   1,724,310
POWER DRIVEN VEHICLE
Filed July 25, 1927

Inventor:
Ferdinand Porsche

Patented Aug. 13, 1929.

1,724,310

UNITED STATES PATENT OFFICE.

FERDINAND PORSCHE, OF STUTTGART-UNTERTURKHEIM, GERMANY, ASSIGNOR TO DAIMLER-BENZ AKTIENGESELLSCHAFT, OF BERLIN, GERMANY, A COMPANY OF GERMANY.

POWER-DRIVEN VEHICLE.

Application filed July 25, 1927, Serial No. 208,311, and in Germany July 29, 1926.

This invention relates in general to power driven vehicles. The invention relates more particularly to the connection of two axles of such a vehicle that are arranged close together and interconnected by a jointed coupling member and each of which carries a pair of driving wheels.

The object of the invention is to connect the one or two axles to the vehicle frame in such a manner as to prevent an axle from turning round an external center, i. e. a center lying outside the axle itself.

To this end links arranged in the form of a parallelogram are used to connect the vehicle frame to the axle in question. In three-axle vehicles the front one of the two rear axles is connected by a link parallelogram to the frame. The result obtained by the invention is that the angle of deflection between the connecting shafts that join the pair of axles by an intermediate joint or joints is reduced.

Vehicles with one driven rear axle are known in which turning movements of the driving wheel axle around an external center are prevented by connecting the axle to the spring supported frame by means of a link parallelogram.

The invention is illustrated by way of example in the three figures of the accompanying drawings.

Figure 1:
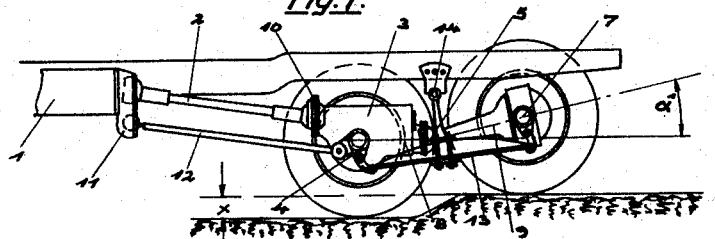
Fig. 1 shows a vehicle frame according to the invention with the front axle sunken.
Figure 2:
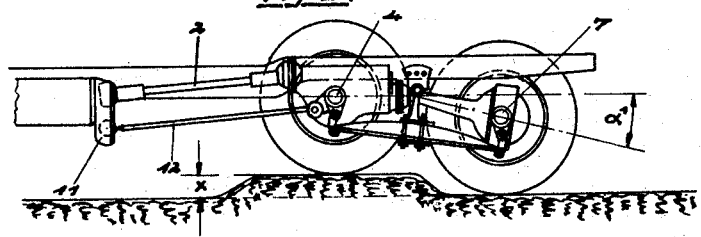
Fig. 2 shows the same frame with the front axle raised.
Figure 3:
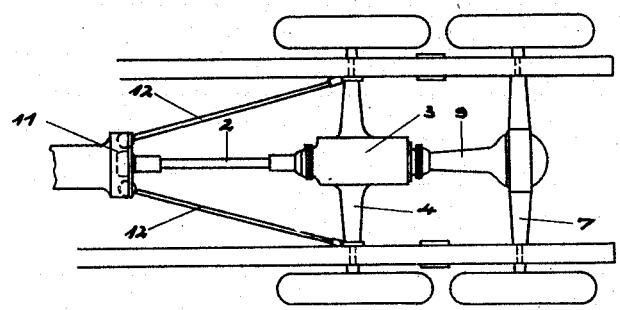
Fig. 3 is a plan view illustrating the arrangement of the thrust tubes of the vehicle frame.

The drawings illustrate the vehicle frame of a power-driven vehicle with three axles, in which a motor, not shown, drives the change-speed gear 1, a transmission shaft supported in a thrust pipe 2 and an intermediate gear in a casing 3, the front axle 4 and the rear axle 7, the latter being driven through connecting shafts 8 and 9 and a joint 5. The trust pipe 2 is attached to the casing 3 by a joint 10, and moreover ties 12 are provided for supporting the casing, these ties forming, with the thrust pipe 2, a parallelogram.

In this novel arrangement the axles 4 and 7 are also driven from the driving shaft in the thrust pipe 2 by means of intermediate gears in the casing 3 and through the connecting shafts 8 and 9 that are coupled together by a joint 5. Due to the spring links 14 and the joint 5 between the connecting shafts the two axles 4 and 7 can accommodate themselves to the unevennesses of the track without mutual interference. If the axle 4 sinks by the amount $x$ into a depression the holding members that hold the axle 4 and that are arranged in the form of a parallelogram do not cause said axle to swing round a center external to itself but make the axle drop vertically or parallel to itself. For all of the above reasons an angle of deflection $\alpha'$ between the connecting shafts 8 and 9 results which is much smaller than the angle $\alpha$. By this means abnormal wear of the parts of joints is avoided.

A similar effect occurs in the reverse direction when the wheels of the axle 4 pass over a rise in the road.

The invention, whose object it is to cause the axles to move parallelly to themselves, and to prevent them from swinging round an external center as in known arrangements, is not limited in its scope to the example shown in the drawing, but may be applied in other forms of construction.

I claim:—

In a power driven vehicle, a vehicle frame, a plurality of driving axles arranged close together, members pivotally connecting the driving axles with one another, a drive shaft casing interposed between the driving axles and the vehicle frame, universal joints connecting the opposite extremities of the drive shaft casing with the vehicle frame and front driving axle, a rod lying substantially parallel to the drive shaft casing, and means pivotally connecting the opposite extremities of the rod with the vehicle frame and front driving axle, said drive shaft casing and rod forming a parallelogram.

In testimony whereof I affix my signature.

FERDINAND PORSCHE.